United States Patent
Hsiao et al.

(10) Patent No.: US 11,260,532 B2
(45) Date of Patent: Mar. 1, 2022

(54) CALIBRATION METHOD FOR ROBOT ARM AND CALIBRATION DEVICE THEREOF

(71) Applicant: Delta Electronics, Inc., Taoyuan (TW)

(72) Inventors: Yuan-Kun Hsiao, Taoyuan (TW); Jian-Jang Lai, Taoyuan (TW); Ko-Yueh Chen, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 345 days.

(21) Appl. No.: 16/571,492

(22) Filed: Sep. 16, 2019

(65) Prior Publication Data

US 2020/0298409 A1    Sep. 24, 2020

(30) Foreign Application Priority Data

Mar. 20, 2019    (CN) .......................... 201910212670.2

(51) Int. Cl.
    *B25J 9/16*    (2006.01)
    *B25J 19/00*    (2006.01)
(52) U.S. Cl.
    CPC .......... *B25J 9/1692* (2013.01); *B25J 9/1697* (2013.01); *B25J 19/0095* (2013.01); *G05B 2219/39024* (2013.01); *G05B 2219/39045* (2013.01)
(58) Field of Classification Search
    CPC .................. B25J 9/1692; B25J 9/1697; G05B 2219/39024; G05B 2219/39045
    See application file for complete search history.

(56) References Cited

U.S. PATENT DOCUMENTS

| | | | |
|---|---|---|---|
| 2016/0161863 A1* | 6/2016 | Den Boef | G03F 7/70633 355/67 |
| 2019/0072862 A1* | 3/2019 | Tarabrin | G03F 7/70616 |
| 2019/0129315 A1* | 5/2019 | Tarabrin | G03F 9/7023 |
| 2019/0384184 A1* | 12/2019 | Pandey | G03F 7/7015 |
| 2020/0133140 A1* | 4/2020 | Warnaar | G01N 21/21 |
| 2020/0285157 A1* | 9/2020 | Tarabrin | G03F 7/70633 |

OTHER PUBLICATIONS

US 11,141,857 B2, 10/2021, Oaki (withdrawn)*
Tan et al., Opto-mechanical tilt sensor using moiré effect for slope movement remote sensing, 2016, IEEE, p. 1130-1134 (Year: 2016).*
Morimoto et al., Shape measurement by light-stepping method using LEDs, 2010, IEEE, p. 1-6 (Year: 2010).*
Cao et al., A Prism-Mask System for Multispectral Video Acquisition, 2011, IEEE, p. 2423-2435 (Year: 2011).*
Moon et al., Calibration method for 3-dimensional tip position tracking sensor, 2013, IEEE, p. 641-644 (Year: 2013).*

* cited by examiner

*Primary Examiner* — Mcdieunel Marc
(74) *Attorney, Agent, or Firm* — Muncy, Geissler, Olds & Lowe, P.C.

(57) ABSTRACT

A calibration device is provided. The calibration device includes a frame, a first optical sensing device, a second optical sensing device and a third optical sensing device. The frame includes a bottom plate and at least four sidewalls, wherein the sidewalls have a first grating hole, a second grating hole, a third grating hole and a fourth grating hole at a first height. The bottom plate has an image recognition pattern, a first measurement point, a second measurement point and a third measurement point.

14 Claims, 10 Drawing Sheets

CALIBRATION METHOD FOR ROBOT ARM AND CALIBRATION DEVICE THEREOF

CROSS REFERENCE TO RELATED APPLICATIONS

This Application claims priority of China Patent Application No. 201910212670.2, filed on Mar. 20, 2019, the entirety of which is incorporated by reference herein.

BACKGROUND OF THE INVENTION

Field of the Invention

The present invention relates to a calibration method for a robot arm and a calibration device thereof, and in particular to an automatic calibration method and a calibration device thereof.

Description of the Related Art

In recent years, robotic arms have been widely used in the manufacturing industry. The end of a robotic arm may be equipped with tool modules to perform the required tasks, such as a drilling tool module, a gripping tool module, or a grinding tool module. These tool modules may also be used with a vision system module. When a tool module is installed at the end of a robot arm, the robot arm does not know the real position of the tool module. The offset relationship between the tool center point (TCP) and the end effect point of the robot arm must be obtained through a calibration process, which is necessary to know the position of the robot arm in the real coordinate system, and to plan the movement path of the robot arm.

In a conventional calibration procedure, the tool center point calibration is performed separately from the vision calibration. The tool center point calibration obtains the offset relationship between the tool center point (TCP) and the end of the robot arm. The vision calibration obtains the offset relationship between the vision system module and the end of the robot arm. The tool center point calibration is performed through contact calibration devices, which has the following risks: (1) the accuracy of the calibration device installation is low; (2) the measuring board wears easily; and (3) the aging of the return spring. These factors may reduce the accuracy of the tool center point (TCP) calibration.

BRIEF SUMMARY OF THE INVENTION

In one embodiment, a calibration device is provided. The calibration device includes a frame, a first optical sensing device, a second optical sensing device and a third optical sensing device. The frame comprises a bottom plate and at least four sidewalls, wherein the sidewalls have a first grating hole, a second grating hole, a third grating hole and a fourth grating hole at a first height, wherein the bottom plate has an image recognition pattern, a first measurement point, a second measurement point and a third measurement point. The first optical sensing device comprises a first light-emitting unit and a first light-receiving unit, the first light-emitting unit is disposed on one of the sidewalls of the frame and provides a first light, and the first light-receiving unit is disposed on the sidewall of the frame corresponding to the first light-emitting unit and receives the first light. The second optical sensing device comprises a second light-emitting unit and a second light-receiving unit, the second light-emitting unit is disposed on one of the sidewalls of the frame and provides a second light, and the second light-receiving unit is disposed on the sidewall of the frame corresponding to the second light-emitting unit and receives the second light. The third optical sensing device comprises a third light-emitting unit and a third light-receiving unit, the third light-emitting unit is disposed on one of the sidewalls of the frame and provides a third light, and the third light-receiving unit is disposed on the sidewall of the frame corresponding to the third light-emitting unit and receives the third light.

In one embodiment, the first grating hole, the second grating hole, the third grating hole and the fourth grating hole are paired parallel and facing each other.

In one embodiment, the calibration device further comprises a fifth grating hole and a sixth grating hole, wherein the fifth grating hole and the sixth grating hole are located on the sidewalls at a second height, and the fifth grating hole is parallel to the sixth grating hole, and faces the sixth grating hole.

In one embodiment, the second height is higher than the first height.

In one embodiment, the first light of the first light-emitting unit passes through the first grating hole, and is received by the first receiving unit via the second grating hole.

In one embodiment, the second light of the second light-emitting unit passes through the third grating hole, and is received by the second receiving unit via the fourth grating hole.

In one embodiment, the third light of the third light-emitting unit passes through the fifth grating hole, and is received by the third receiving unit via the sixth grating hole.

In one embodiment, the first optical sensing device and the second optical sensing device are disposed at the first height of the sidewalls, and the third optical sensing device is disposed at the second height of the sidewalls.

In one embodiment, the first light and the second light are on a first plane at the first height, the third light is on a second plane at the second height, the first plane is parallel to the second plane, the first plane is parallel to the image recognition pattern, and the first light and the second light form a light intersection point.

In one embodiment, a calibration method for a robot arm is provided. The calibration method includes the following steps. First, a robot arm is provided, wherein the robot arm comprises an end point of reference, a connection stage and an image capturing device. Then, a machine tool is provided, wherein the machine tool and the image capturing device are disposed on the connection stage. Next, a calibration device is provided, wherein the calibration device comprises an image recognition pattern, a first measurement point, a second measurement point and a third measurement point. Then, images of the image recognition pattern, the first measurement point, the second measurement point and the third measurement point are captured, wherein a first transfer matrix of the image capturing device relative to the end point of reference is calculated according to the image recognition pattern, and actual coordinates of the image capturing device relative to the end point of reference are obtained. Next, a second transfer matrix of the first measurement point, the second measurement point and the third measurement point relative to the end point of reference are obtained from measured size values of the images of the first measurement point, the second measurement point and the third measurement point, and actual size values of the images of the first measurement point, the second measurement point and the third measurement point.

In one embodiment, the calibration device comprises a first optical sensing device, a second optical sensing device and a third optical sensing device, the first optical sensing device comprises a first light-emitting unit and a first light-receiving unit, the first light-emitting unit provides a first light, and the first light-receiving unit receives the first light, the second optical sensing device comprises a second light-emitting unit and a second light-receiving unit, the second light-emitting unit provides a second light, and the second light-receiving unit receives the second light, the third optical sensing device comprises a third light-emitting unit and a third light-receiving unit, the third light-emitting unit is provides a third light, and the third light-receiving unit receives the third light.

In one embodiment, the first light and the second light are on a first plane at a first height, the third light is on a second plane at a second height, the first plane is parallel to the second plane, the first plane is parallel to the image recognition pattern, and the first light and the second light form a light intersection point.

In one embodiment, the calibration method further comprises calculating a coordinate of the light intersection point relative to the end point of reference via the second transfer matrix.

In one embodiment, the calibration method further comprises putting the machine tool in the calibration device by the robot arm, wherein the an end of the machine tool is moved to the light intersection point according to blocking information of the first light, the second light and the third light, and a calibration process is completed automatically by calculating actual coordinates of the end of the machine tool relative to the end point of reference from a base coordinate of the light intersection point relative to the end point of reference.

Utilizing the calibration method of the embodiment, the calibration process can be completed automatically. The speed and the reliability of the calibration process is improves. The efficiency is increased, and the manufacturing cost is decreased.

In the embodiments of the invention, the frame is integrally formed. The machined holes are formed on the frame. The three machined holes define a coordinate system (second transfer matrix). The second transfer matrix connects the visual coordinate system to the physical coordinate system of the light intersection point, modifies the visual coordinate system, and the physical coordinate system of the light intersection point can be transferred to the robot arm coordinate system. According to the position of the light intersection point, the relationship between the robot arm coordinate system, the visual coordinate system and the machine tool coordinate can be built automatically. Therefore, the conventional process of manually aligning the tip of the machine tool to the tip of the alignment device is omitted.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
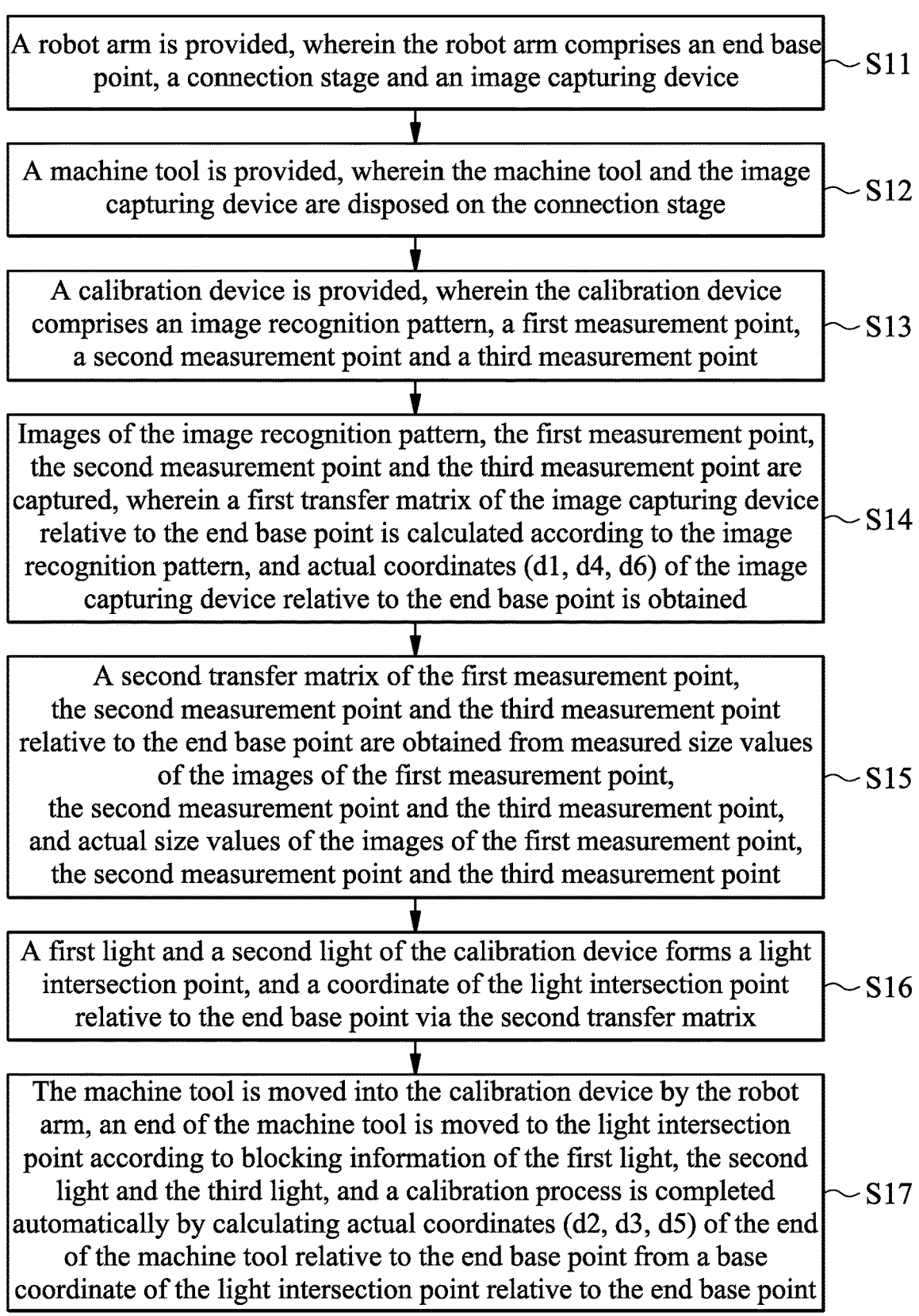
FIG. 1 is a flow chart of a calibration method of an embodiment of the invention.

FIG. 1 shows a flow chart of a calibration method of an embodiment of the invention. The calibration method includes the following steps. First, a robot arm is provided, wherein the robot arm comprises an end point of reference, a connection stage and an image capturing device (S11). Then, a machine tool is provided, wherein the machine tool and the image capturing device are disposed on the connection stage (S12). Next, a calibration device is provided, wherein the calibration device comprises an image recognition pattern, a first measurement point, a second measurement point and a third measurement point (S13). Then, images of the image recognition pattern, the first measurement point, the second measurement point and the third measurement point are captured, wherein a first transfer matrix of the image capturing device relative to the end point of reference is calculated according to the image recognition pattern, and actual coordinates (d1, d4, d6) of the image capturing device relative to the end point of reference is obtained (S14). Next, a second transfer matrix of the first measurement point, the second measurement point and the third measurement point relative to the end point of reference are obtained from measured size values of the images of the first measurement point, the second measurement point and the third measurement point, and actual size values of the images of the first measurement point, the second measurement point and the third measurement point (S15). Then, a first light and a second light of the calibration device forms a light intersection point, and a coordinate of the light intersection point relative to the end point of reference via the second transfer matrix (S16). Finally, the machine tool is moved into the calibration device by the robot arm, an end of the machine tool is moved to the light intersection point according to blocking information of the first light, the second light and the third light, and a calibration process is completed automatically by calculating actual coordinates (d2, d3, d5) of the end of the machine tool relative to the end point of reference from a base coordinate of the light intersection point relative to the end point of reference (S17).

Figure 2A:
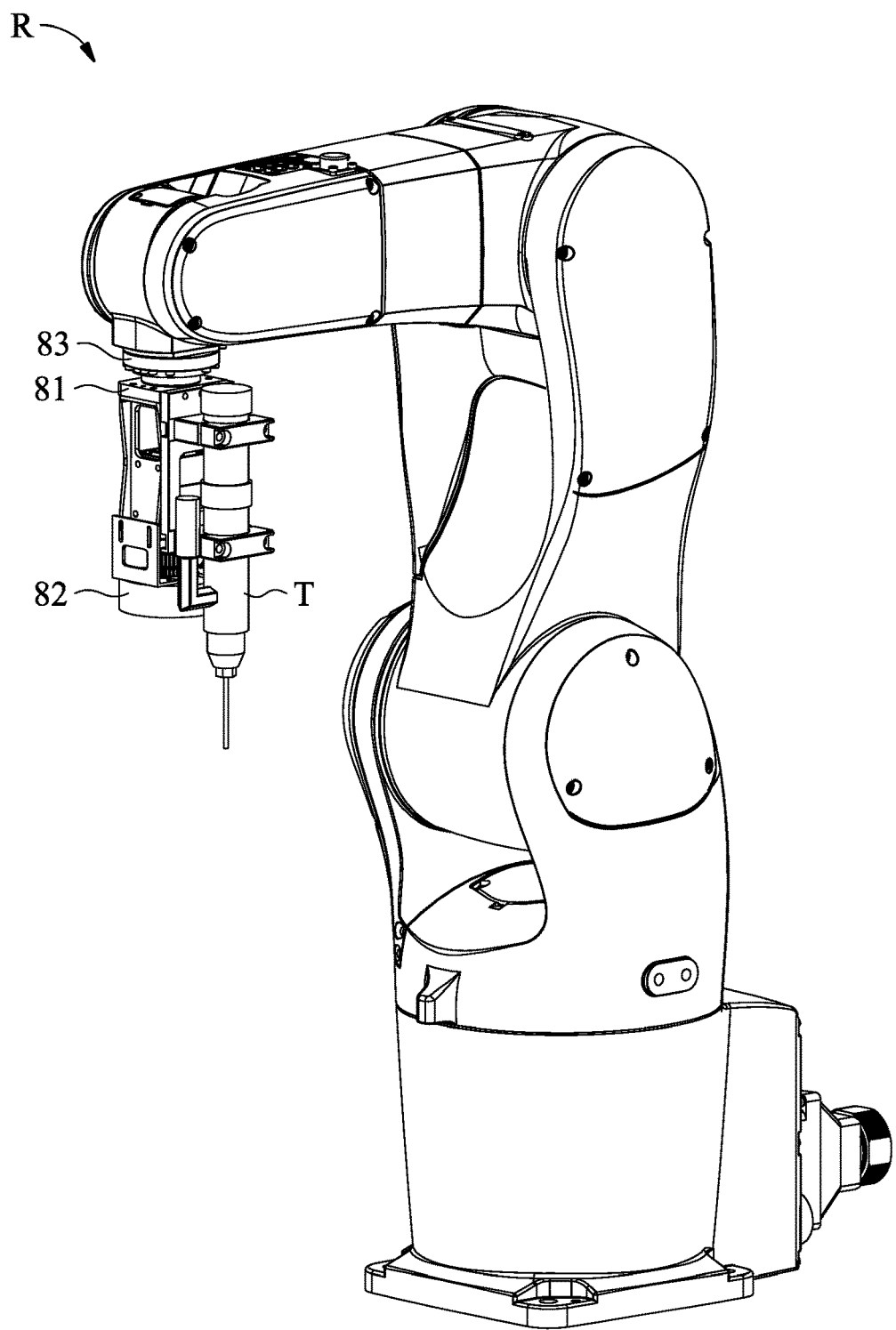
FIG. 2A shows a robot arm of the embodiment of the invention.
Figure 2B:
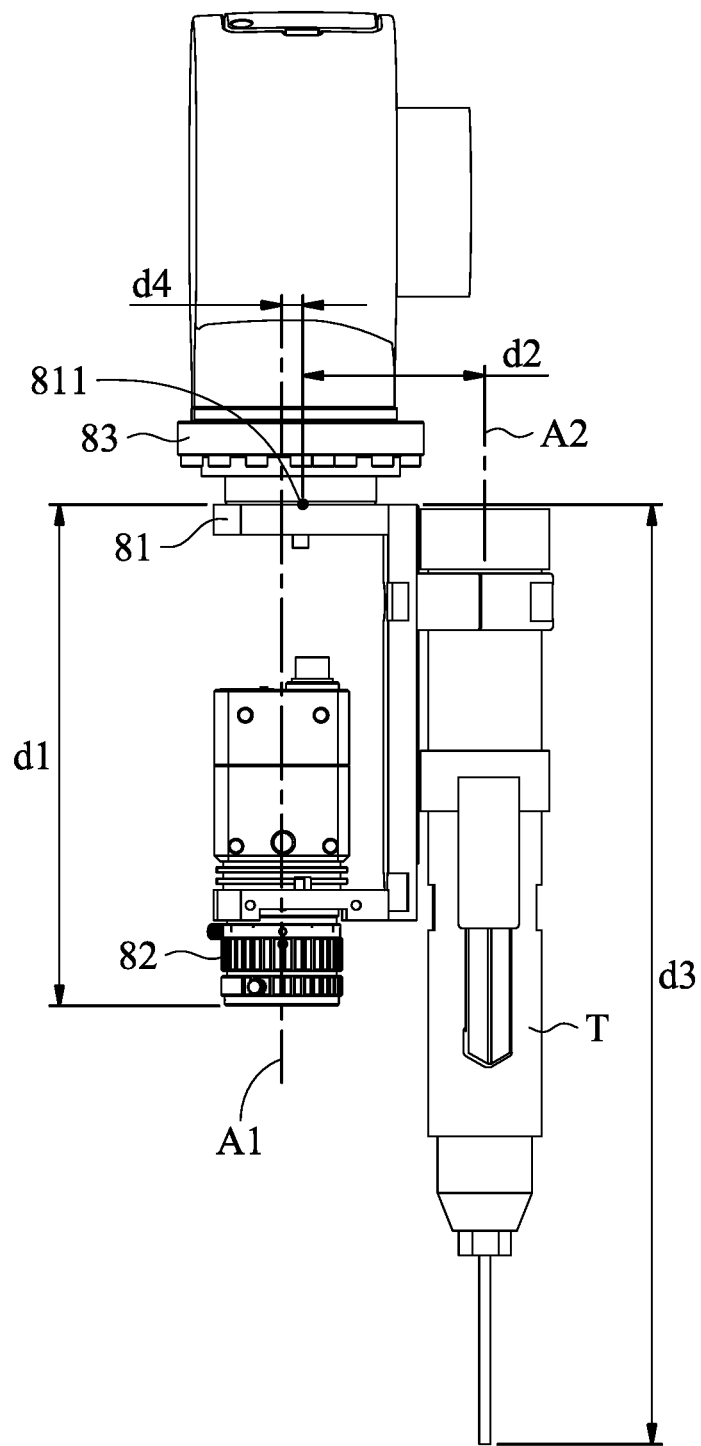
FIGS. 2B and 2C show details of the robot arm of the embodiment of the invention.
Figure 2C:
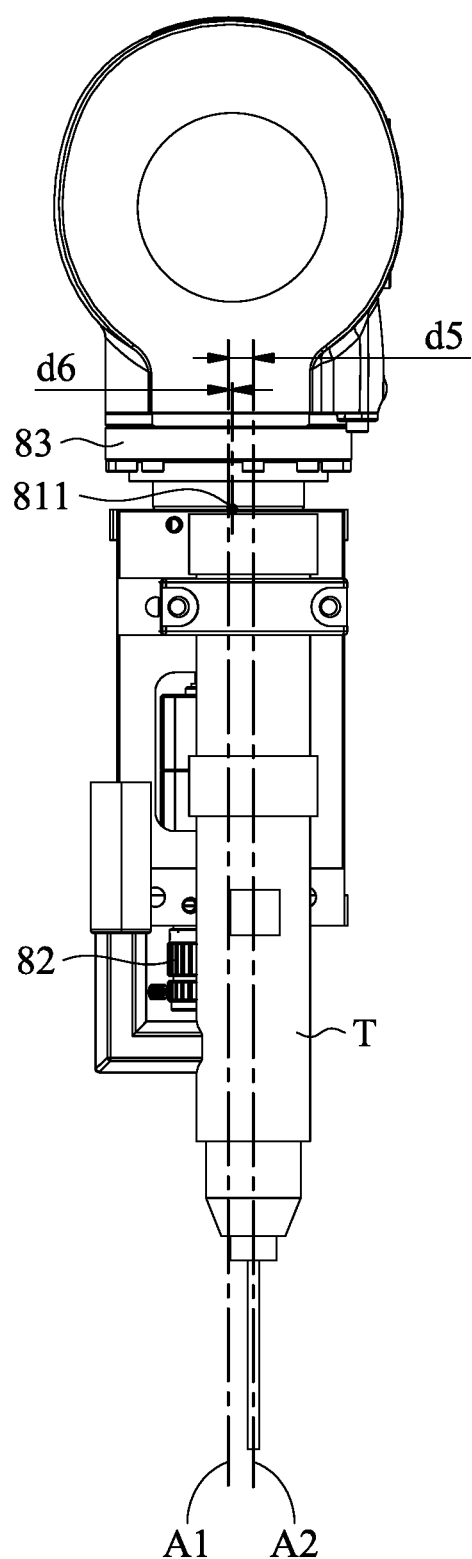
Figure 3A:
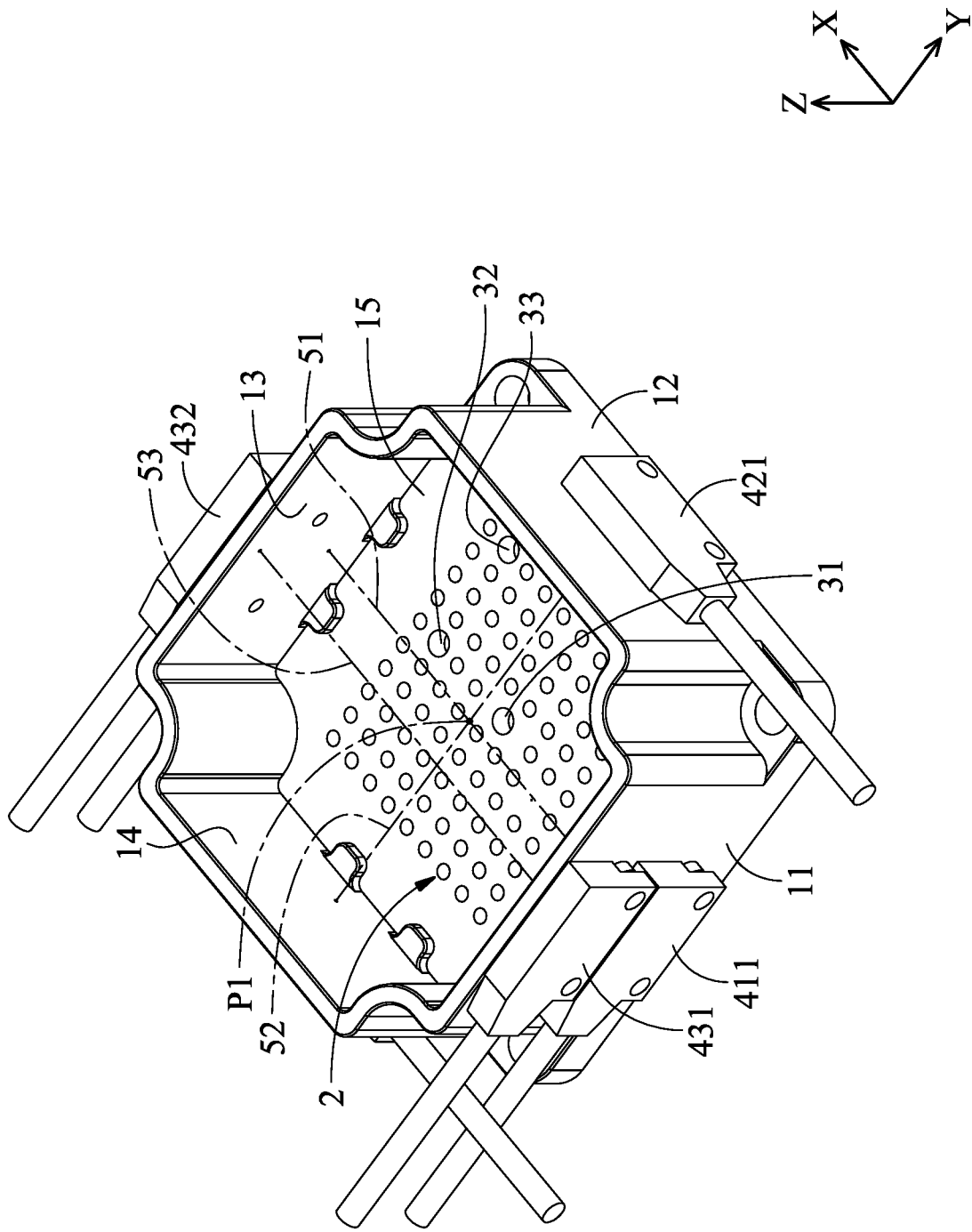
FIG. 3A is a perspective view of the calibration device of the embodiment of the invention.

FIGS. 2A, 2B and 2C show the robot arm of the embodiment of the invention. FIG. 3A is a perspective view of the calibration device C of the embodiment of the invention. With reference to FIGS. 1, 2A, 2B, 2C and 3A, the robot arm R includes the connection stage 81 and the image capturing device 82. The connection stage 81 has the end point of reference 811. The end point of reference 811 can be located on a wrist portion of the robot arm R. The disclosure is not meant to restrict the invention.

According to the first transfer matrix, the relative distance d1 between a lens of the image capturing device 82 and the end point of reference 811 is obtained, the relative distance d4 between a base axis A1 of the image capturing device 82 and the end point of reference 811 is obtained, and the relative distance d6 between the base axis A1 of the image capturing device 82 and the end point of reference 811 is obtained.

According to the base coordinate of the light intersection point relative to the end point of reference, the actual coordinates of the end of the machine tool relative to the end point of reference are obtained. The actual coordinates include the relative distance d2 between a tool axis A2 of the machine tool T and the end point of reference 811, the relative distance d3 between the end of the machine tool and the end point of reference 811, and the relative distance d5 between the base axis A1 of the image capturing device 82 and the tool axis A2 of the machine tool T.

With reference to FIGS. 2A, 2B, 2C and 3A, the machine tool T and the image capturing device 82 are affixed to the connection stage 81. The machine tool T can be cutlery, soldering bit or other machine tools.

Figure 4:
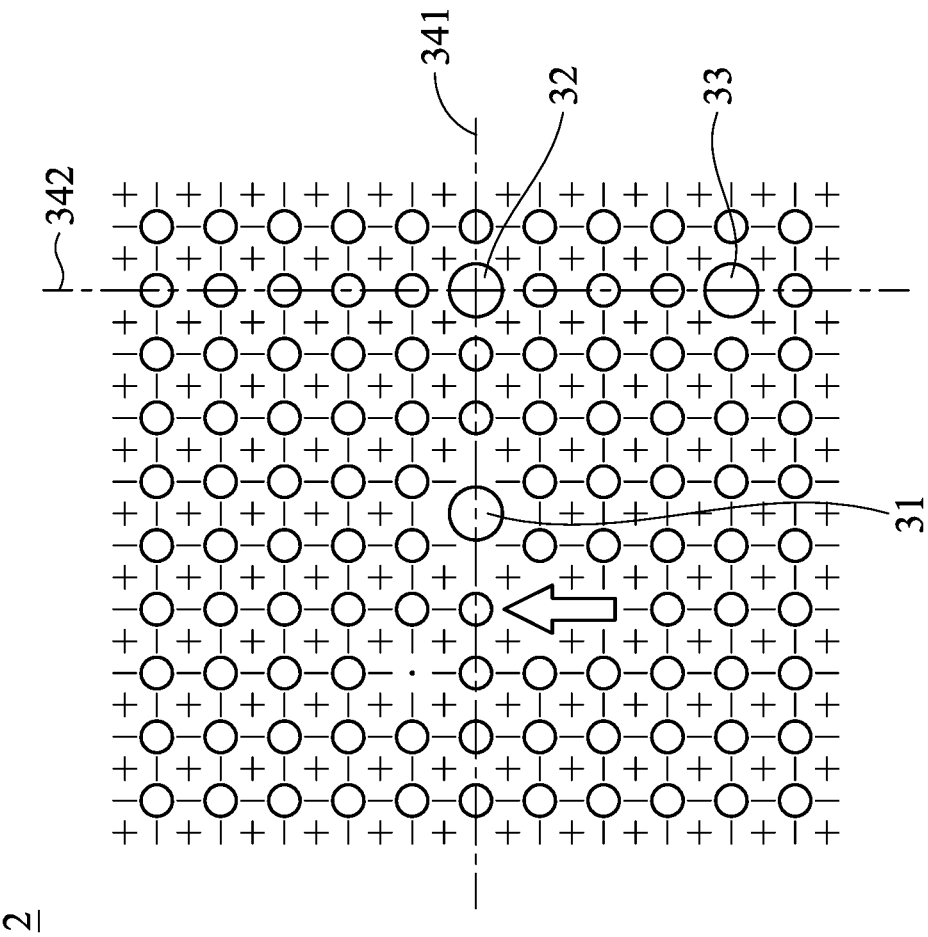
FIG. 4 shows an image recognition pattern of the embodiment of the invention.

With reference to FIG. 4, which shows one image recognition pattern 2 of the embodiment of the invention, the image recognition pattern 2 includes point, line, and direction indicator. The image recognition pattern 2 can be modified. The disclosure is not meant to restrict the invention.

Figure 3B:
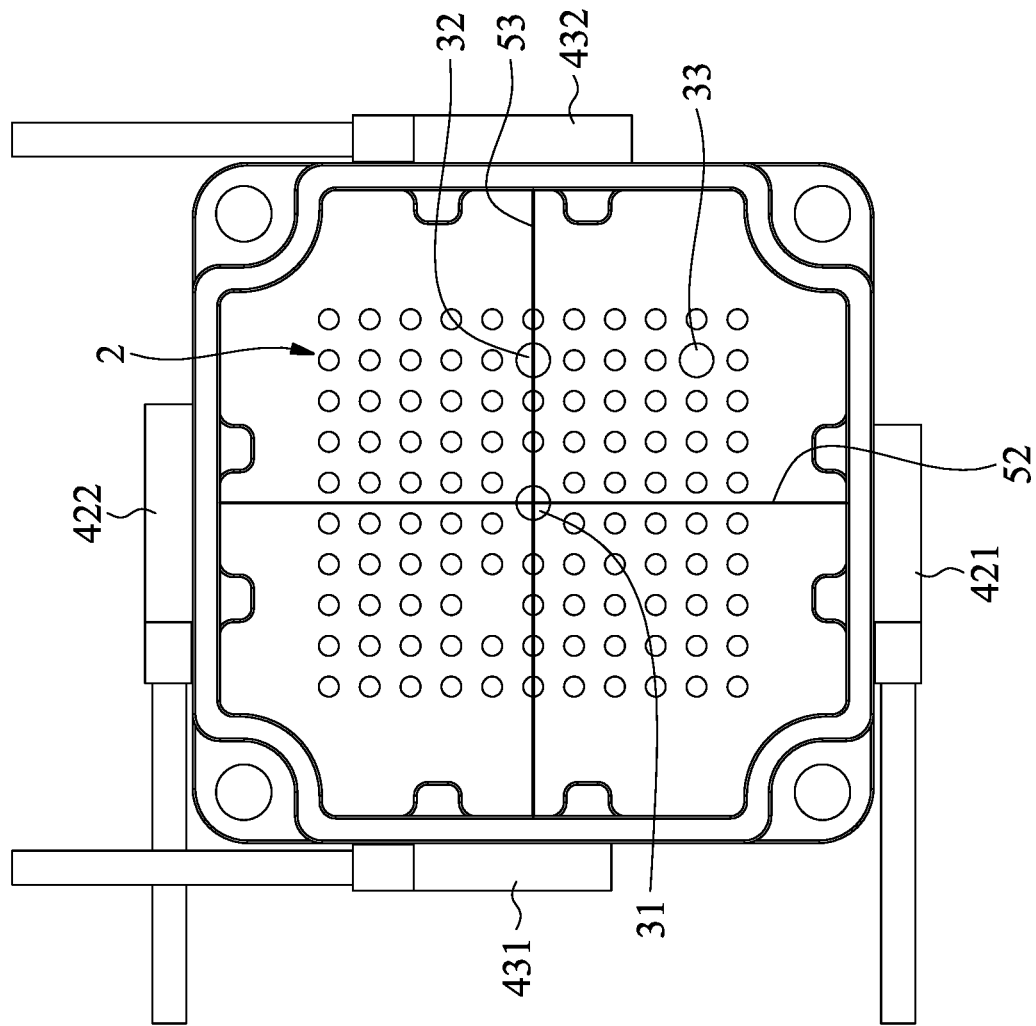
FIG. 3B is a top view of the calibration device of the embodiment of the invention.

FIG. 3B is a top view of the calibration device C of the embodiment of the invention. With reference to FIGS. 3B and 4, the calibration device C includes the first measurement point 31, the second measurement point 32 and the third measurement point 33. The first measurement point 31 and the second measurement point 32 are disposed along a first axis 341. The second measurement point 32 and the third measurement point 33 are disposed along a second axis 342. The second axis 342 is perpendicular to the first axis 341.

Figure 3C:
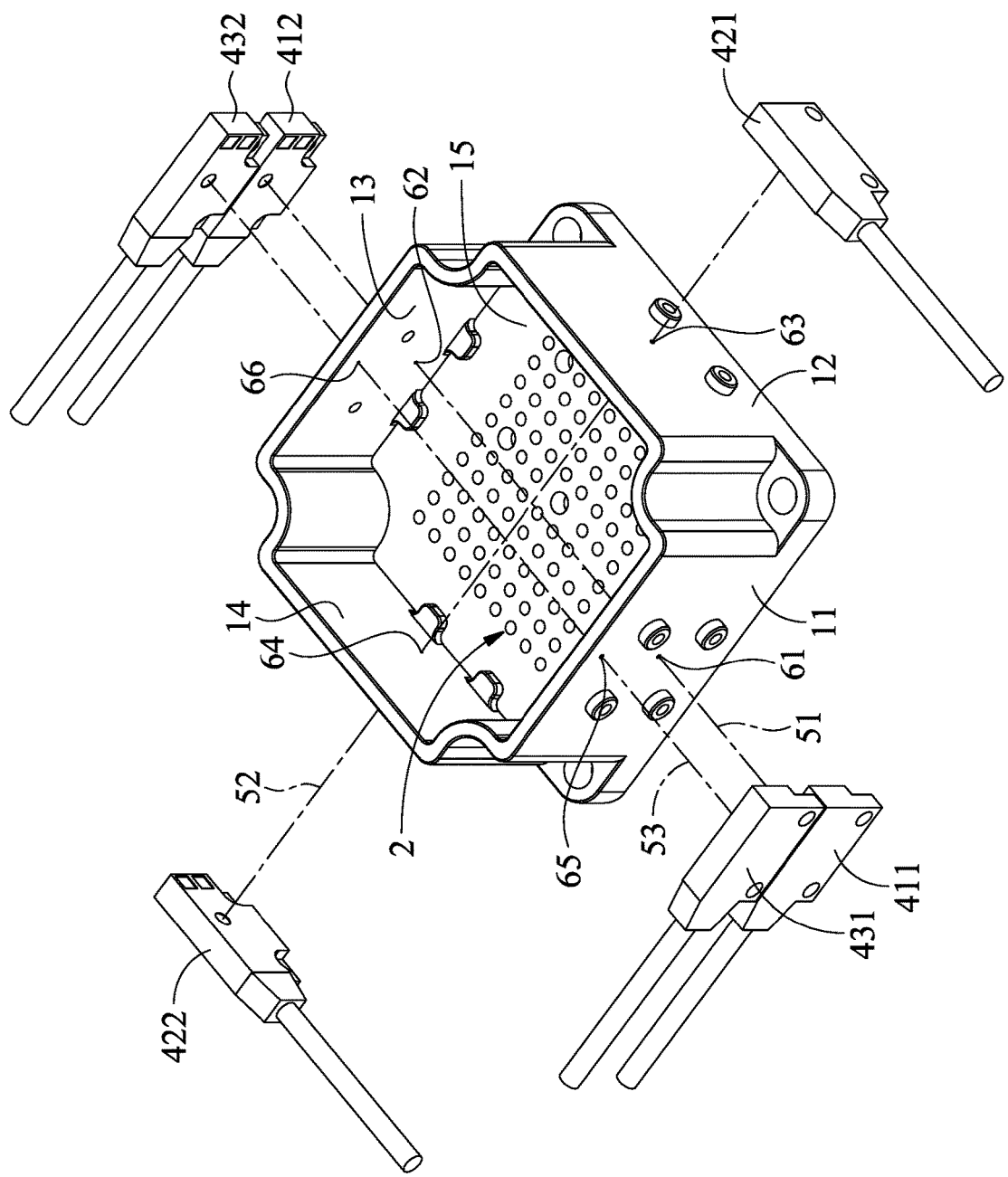
FIG. 3C is an exploded view of the calibration device of the embodiment of the invention.

FIG. 3C is an exploded view of the calibration device C of the embodiment of the invention. With reference to FIG. 3C, in one embodiment, the calibration device includes a first optical sensing device, second optical sensing device and a third optical sensing device. The first optical sensing device comprises a first light-emitting unit 411 and a first light-receiving unit 412. The second optical sensing device comprises a second light-emitting unit 421 and a second light-receiving unit 422. The third optical sensing device comprises a third light-emitting unit 431 and a third light-receiving unit 432. The first light-emitting unit 411 provides a first light 51. The second light-emitting unit 421 provides a second light 52. The third light-emitting unit 431 provides a third light 53. The first light 51 is adapted to be received by the first light-receiving unit 412. The second light 52 is adapted to be received by the second light-receiving unit 422. The third light 53 is adapted to be received by the third light-receiving unit 432.

In the embodiments of the invention, the frame is integrally formed. The machined holes are formed on the frame. The three machined holes define a coordinate system (second transfer matrix). The second transfer matrix connects the visual coordinate system to the physical coordinate system of the light intersection point, modifies the visual coordinate system, and the physical coordinate system of the light intersection point can be transferred to the robot arm coordinate system. According to the position of the light intersection point, the relationship between the robot arm coordinate system, the visual coordinate system and the machine tool coordinate can be automatically built. Therefore, the conventional process of manually aligning the tip of the machine tool to the tip of the alignment device is omitted.

In the embodiments of the invention, the relationship between the first light 51, the second light 52, the third light 53 and the end point of reference is precisely defined. Since the image recognition pattern 2 is formed by secondary processing (for example, printed on the frame 1), the second transfer matrix is required to compensate the tolerance.

The relative measured size values can be obtained by measuring the position of the first measurement point 31, the second measurement point 32 and the third measurement point 33 relative to the first light 51, the second light 52, and the third light 53. In one embodiment, the relative measured size values can be obtained through the three-dimensional measurement apparatus.

With reference to FIGS. 3A, 3B and 3C, in one embodiment, the calibration device C includes the frame 1 and the image recognition pattern 2. The frame 1 includes a bottom plate 15, a sidewall 11, a sidewall 12, a sidewall 13 and a sidewall 14. Sidewall 11 is perpendicular to sidewall 12. Sidewall 11 faces sidewall 13 and is parallel to sidewall 13. Sidewall 12 faces sidewall 14 and is parallel to sidewall 14. Sidewall 11, sidewall 12, sidewall 13 and sidewall 14 are disposed on the edges of the bottom plate 15. The image recognition pattern 2 is disposed on the bottom plate 15. The bottom plate 15 has the first measurement point 31, the second measurement point 32, and the third measurement point 33. The first measurement point 31 and the second measurement point 32 are arranged along the first axis 341. The second measurement point 32 and the third measurement point 33 are arranged along the second axis 342. The first axis 341 is perpendicular to the second axis 342.

In one embodiment, the first measurement point 31, the second measurement point 32 and the third measurement point 33 can be blind holes, which are pre-formed on the bottom plate 15. The first measurement point 31, the second measurement point 32 and the third measurement point 33 can also be through holes, protrusions or other structures.

Figure 5:
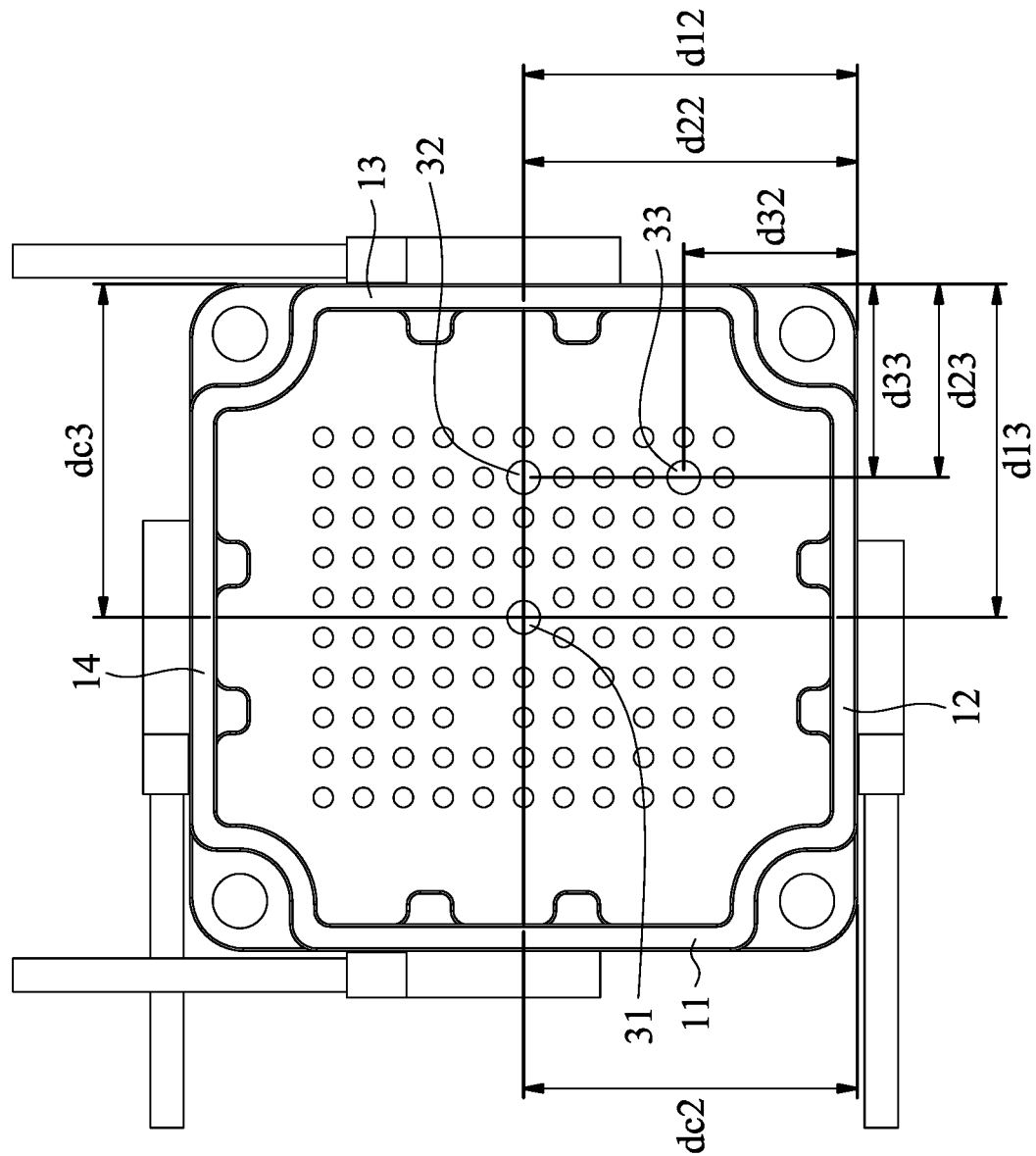
FIG. 5 shows the measured size values of the embodiment of the invention.

With reference to FIG. 5, in one embodiment, the relative measured size values comprise the distance d12 between the first measurement point 31 and the sidewall 12, the distance d13 between the first measurement point 31 and the sidewall 13, the distance d22 between the second measurement point 32 and the sidewall 12, the distance d23 between the second measurement point 32 and the sidewall 13, the distance d32 between the third measurement point 33 and the sidewall 12, the distance d33 between the third measurement point 33 and the sidewall 13, the distance dc2 between the center of the bottom plate 15 and the sidewall 12, and the distance dc3 between the center of the bottom plate 15 and the sidewall 13. The disclosure is not meant to restrict the invention. The sidewalls are only one of the measurement base choices. The transfer matrix can be obtained by the relative distance between the first measurement point 31, the second measurement point 32 and the third measurement point 33.

Figure 6:
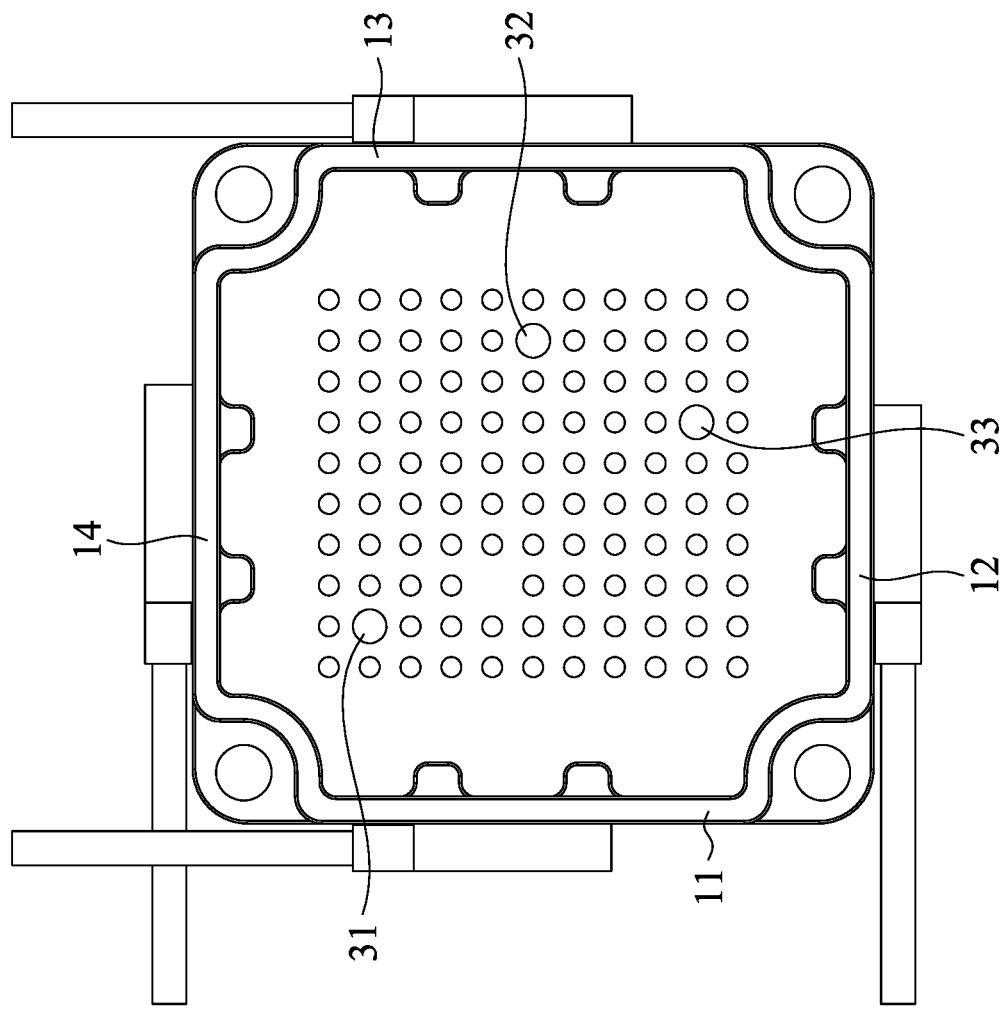
FIG. 6 shows the measured size values of another embodiment of the invention.

With reference to FIG. 6, in one embodiment, the positions of the first measurement point 31, the second measurement point 32 and the third measurement point 33 can be changed. The transfer matrix can be obtained by the relative distance between the first measurement point 31, the second measurement point 32 and the third measurement point 33.

With reference to FIGS. 3A, 3B, and 3C, in one embodiment, the first light 51 and the second light 52 are on a first plane, the third light 53 is on a second plane, the first plane is parallel to the second plane, the first plane differs from the second plane, the first plane is parallel to the image recognition pattern, and the first light 51 and the second light 52 form the light intersection point P1 (FIG. 3A).

With reference to FIGS. 3A, 3B, and 3C, in one embodiment, the light intersection point P1 and a first center of the first measurement point 31 are on a straight line perpendicular to the bottom plate 15.

With reference to FIGS. 3A, 3B, and 3C, in one embodiment, the first light passes over a second center of the second measurement point.

With reference to FIGS. 3A, 3B, and 3C, in one embodiment, the first light-emitting unit 411 is disposed on the sidewall 11, the second light-emitting unit 421 is disposed on the sidewall 12, the first light-receiving unit 412 is disposed on the sidewall 13, and the second light-receiving unit 422 is disposed on the sidewall 14.

With reference to FIGS. 3A, 3B, and 3C, in one embodiment, the third light-emitting unit 431 is disposed on the sidewall 11. The first light-emitting unit 411 is between the third light-emitting unit 431 and the bottom plate 15 is a Z direction.

With reference to FIGS. 3A, 3B, and 3C, in one embodiment, the sidewalls has a first grating hole 61, a second grating hole 62, a third grating hole 63 and a fourth grating hole 64 at a first height. The first grating hole 61 faces the second grating hole 62, and the third grating hole 63 faces the fourth grating hole 64. In one embodiment, a fifth grating hole 65 and a sixth grating hole 66 are located on the sidewalls at a second height. The fifth grating hole is parallel to the sixth grating hole, and faces the sixth grating hole. The second height is higher than the first height. The first light 51 of the first light-emitting unit 411 passes through the first grating hole 61, and is received by the first receiving unit 412 via the second grating hole 62. The second light 52 of the second light-emitting unit 421 passes through the third grating hole 63, and is received by the second receiving unit 422 via the fourth grating hole 64. The third light 53 of the third light-emitting unit 431 passes through the fifth grating hole 65, and is received by the third receiving unit 432 via the sixth grating hole 66.

In the embodiments above, the first light 51 and the second light 52 are on the first plane at the first height, the third light 53 is on the second plane at the second height, the first plane is parallel to the second plane, the first plane is parallel to the image recognition pattern, and the first light 51 and the second light 52 form the light intersection point.

In the embodiments above, the grating holes are small and straight through holes, which shape the first light 51, the second light 52 and the third light 53 into straight light beams.

In one embodiment, the sidewalls are perpendicular to each other. However, the disclosure is not meant to restrict the invention. In another embodiment, the sidewalls can form a continuous wall, such as an annular sidewall.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A calibration device, comprising:
   a frame, comprising a bottom plate and at least four sidewalls, wherein there are a first grating hole, a second grating hole, a third grating hole and a fourth grating hole at a first height on the sidewalls, and an image recognition pattern, a first measurement point, a second measurement point and a third measurement point on the bottom plate;
   a first optical sensing device, comprising a first light-emitting unit disposed on one of the sidewalls of the frame and configured to provide a first light, and a first receiving unit disposed on a sidewall corresponding to the sidewall on which the first light-emitting unit is disposed and configured to receive the first light;
   a second optical sensing device, comprising a second light-emitting unit disposed on one of the sidewalls of the frame and configured to provide a second light, and a second receiving unit disposed on a sidewall corresponding to the sidewall on which the second light-emitting unit is disposed and configured to receive the second light; and
   a third optical sensing device, comprising a third light-emitting unit disposed on one of the sidewalls of the frame and configured to provide a third light, and a third receiving unit disposed on a sidewall corresponding to the sidewall on which the third light-emitting unit is disposed and configured to receive the third light.

2. The calibration device as claimed in claim 1, wherein the first grating hole faces the second grating hole, and the third grating hole faces the fourth grating hole.

3. The calibration device as claimed in claim 1, further comprising a fifth grating hole and a sixth grating hole, wherein the fifth grating hole and the sixth grating hole are located on the sidewalls at a second height, and the fifth grating hole is parallel to the sixth grating hole, and faces the sixth grating hole.

4. The calibration device as claimed in claim 3, wherein the second height is higher than the first height.

5. The calibration device as claimed in claim 2, wherein the first light is configured to pass through the first grating hole, and to be received by the first receiving unit via the second grating hole.

6. The calibration device as claimed in claim 2, wherein the second light is configured to pass through the third grating hole, and to be received by the second receiving unit via the fourth grating hole.

7. The calibration device as claimed in claim 3, wherein the third light is configured to pass through the fifth grating hole, and to be received by the third receiving unit via the sixth grating hole.

8. The calibration device as claimed in claim 4, wherein the first optical sensing device and the second optical sensing device are disposed at the first height of the sidewalls, and the third optical sensing device is disposed at the second height of the sidewalls.

9. The calibration device as claimed in claim 1, wherein the first light and the second light are on a first plane at the first height, the third light is on a second plane at the second height, the first plane is parallel to the second plane, the first plane is parallel to the image recognition pattern, and the first light and the second light intersect to form a light intersection point.

10. A calibration method for a robot arm, comprising:
providing a robot arm with an end point of reference, a connection stage and an image capturing device, wherein the image capturing device is disposed on the connection stage;
providing a machine tool disposed on the connection stage;
providing a calibration device comprising an image recognition pattern, a first measurement point, a second measurement point and a third measurement point;
capturing images of the image recognition pattern, the first measurement point, the second measurement point and the third measurement point, wherein a first transfer matrix of the image capturing device relative to the end point of reference is calculated according to the image recognition pattern, and actual coordinates of the image capturing device relative to the end point of reference are obtained; and
obtaining a second transfer matrix of the first measurement point, the second measurement point and the third measurement point relative to the end point of reference from measured size values of the images of the first measurement point, the second measurement point and the third measurement point, and actual size values of the images of the first measurement point, the second measurement point and the third measurement point.

11. The calibration method as claimed in claim 10, wherein the calibration device further comprises a first optical sensing device, a second optical sensing device and a third optical sensing device, wherein the first optical sensing device comprises a first light-emitting unit configured to provide a first light, and a first receiving unit configured to receive the first light, the second optical sensing device comprises a second light-emitting unit and a second light-receiving unit, the second light-emitting unit provides a second light, and the second light-receiving unit receives the second light, the third optical sensing device comprises a third light-emitting unit and a third light-receiving unit, the third light-emitting unit is provides a third light, and the third light-receiving unit receives the third light.

12. The calibration method as claimed in claim 11, wherein the first light and the second light are on a first plane at a first height, the third light is on a second plane at a second height, the first plane is parallel to the second plane, the first plane is parallel to the image recognition pattern, and the first light and the second light form a light intersection point.

13. The calibration method as claimed in claim 12, further comprising:
calculating coordinates of the light intersection point relative to the end point of reference via the second transfer matrix.

14. The calibration method as claimed in claim 13, further comprising:
the robot arm puts the machine tool in the calibration device, wherein the an end of the machine tool is moved to the light intersection point according to blocking information of the first light, the second light and the third light, and a calibration process is completed automatically by calculating actual coordinates of the end of the machine tool relative to the end point of reference from a base coordinate of the light intersection point relative to the end point of reference.

* * * * *